US008942716B2

(12) United States Patent
Usuda et al.

(10) Patent No.: US 8,942,716 B2
(45) Date of Patent: Jan. 27, 2015

(54) RADIO RESOURCE CONTROL METHOD, RADIO BASE STATION, AND RADIO NETWORK CONTROLLER

(75) Inventors: Masafumi Usuda, Yokosuka (JP); Anil Umesh, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 953 days.

(21) Appl. No.: 11/359,436

(22) Filed: Feb. 23, 2006

(65) Prior Publication Data
US 2006/0189323 A1  Aug. 24, 2006

(30) Foreign Application Priority Data
Feb. 24, 2005  (JP) ................................. 2005-049647

(51) Int. Cl.
H04W 72/00 (2009.01)
H04W 28/22 (2009.01)
H04L 1/00 (2006.01)
H04L 1/18 (2006.01)
H04W 52/16 (2009.01)

(52) U.S. Cl.
CPC ............. *H04W 28/22* (2013.01); *H04L 1/0025* (2013.01); *H04L 1/0026* (2013.01); *H04L 1/1812* (2013.01); *H04W 52/16* (2013.01)
USPC ..... 455/452.2; 455/450; 455/451; 455/452.1; 375/224; 375/225; 370/331; 370/332; 370/333

(58) Field of Classification Search
USPC ................................ 455/450–452.2, 455, 464
See application file for complete search history.

(56) References Cited

U.S. PATENT DOCUMENTS

| 5,659,879 | A  | * | 8/1997 | Dupuy ............................ 455/15 |
| 6,185,428 | B1 | * | 2/2001 | Kingdon et al. ........... 455/456.2 |
| 6,363,252 | B1 | * | 3/2002 | Hamalainen et al. ......... 455/436 |
| 6,515,986 | B1 | * | 2/2003 | Mai et al. ...................... 370/366 |
| 6,628,946 | B1 | * | 9/2003 | Wiberg et al. ................ 455/434 |
| 6,721,568 | B1 |   | 4/2004 | Gustavsson et al. |
| 6,728,217 | B1 | * | 4/2004 | Amirijoo et al. .............. 370/252 |
| 6,963,741 | B2 | * | 11/2005 | Johansson et al. ............ 455/423 |
| 6,970,427 | B2 | * | 11/2005 | Ranta-Aho et al. ........... 370/236 |
| 7,327,716 | B2 | * | 2/2008 | Fong et al. .................... 370/349 |

(Continued)

FOREIGN PATENT DOCUMENTS

JP    2003-309875    10/2003
WO   WO 2005/109941 A1   11/2005

(Continued)

OTHER PUBLICATIONS

3GPP TS 25.309 V6.1.0 (Dec. 2004) 3rd Generation Partnership Project; Technical Specification Group Radio Access Network; FDD Enhanced Uplink; Overall description; Stage 2 (Release 6).*

(Continued)

*Primary Examiner* — Mehmood B Khan
(74) *Attorney, Agent, or Firm* — Marvin A. Motsenbocker; Mots Law, PLLC

(57) ABSTRACT

A radio resource control method of controlling a radio resource for transmitting user data by a mobile station via an uplink, including: sending, from a radio base station, a signal indicative of a reduction of a maximum allowable transmission rate of the user data signaled to the mobile station connected to the radio base station, to a radio network controller; and controlling, at the radio network controller, the radio resource based on the reported signal indicative of the reduction of the maximum allowable transmission rate.

14 Claims, 8 Drawing Sheets

(56) References Cited

U.S. PATENT DOCUMENTS

| | | | |
|---|---|---|---|
| 7,362,726 B2* | 4/2008 | Petrovic et al. | 370/329 |
| 7,408,902 B2* | 8/2008 | Zeira et al. | 370/333 |
| 7,411,974 B2* | 8/2008 | Attar et al. | 370/465 |
| 2001/0055971 A1* | 12/2001 | Irwin et al. | 455/450 |
| 2002/0146024 A1* | 10/2002 | Harris et al. | 370/417 |
| 2002/0172192 A1* | 11/2002 | Hunzinger et al. | 370/352 |
| 2003/0171123 A1* | 9/2003 | Laakso et al. | 455/453 |
| 2003/0214951 A1* | 11/2003 | Joshi et al. | 370/395.42 |
| 2003/0219037 A1* | 11/2003 | Toskala et al. | 370/496 |
| 2004/0043783 A1* | 3/2004 | Anderson | 455/522 |
| 2004/0082363 A1* | 4/2004 | Hosein | 455/560 |
| 2004/0109424 A1* | 6/2004 | Chheda | 370/331 |
| 2004/0185868 A1* | 9/2004 | Jain et al. | 455/453 |
| 2004/0196826 A1* | 10/2004 | Bao et al. | 370/352 |
| 2004/0202136 A1* | 10/2004 | Attar et al. | 370/333 |
| 2004/0218565 A1* | 11/2004 | Davis | 370/331 |
| 2004/0246897 A1* | 12/2004 | Ma et al. | 370/230 |
| 2005/0002366 A1* | 1/2005 | Toskala et al. | 370/338 |
| 2005/0036449 A1* | 2/2005 | Ranta-Aho et al. | 370/235 |
| 2005/0043034 A1* | 2/2005 | Abdel-Ghaffar et al. | 455/453 |
| 2005/0053081 A1* | 3/2005 | Andersson et al. | 370/401 |
| 2005/0073984 A1* | 4/2005 | Ahn et al. | 370/342 |
| 2005/0107047 A1* | 5/2005 | Dartois | 455/101 |
| 2005/0113106 A1* | 5/2005 | Duan et al. | 455/452.2 |
| 2005/0117508 A1* | 6/2005 | Gaal | 370/209 |
| 2005/0117551 A1* | 6/2005 | Han et al. | 370/335 |
| 2005/0141476 A1* | 6/2005 | Choi et al. | 370/348 |
| 2005/0163056 A1* | 7/2005 | Ranta-Aho et al. | 370/252 |
| 2005/0207359 A1* | 9/2005 | Hwang et al. | 370/278 |
| 2005/0237935 A1* | 10/2005 | Chae et al. | 370/232 |
| 2005/0243762 A1* | 11/2005 | Terry et al. | 370/328 |
| 2005/0249148 A1* | 11/2005 | Nakamata et al. | 370/328 |
| 2006/0084459 A1* | 4/2006 | Phan et al. | 455/522 |
| 2006/0140115 A1* | 6/2006 | Timus et al. | 370/230 |
| 2006/0153140 A1* | 7/2006 | Chiang et al. | 370/335 |
| 2006/0159105 A1* | 7/2006 | Kleo | 370/395.21 |
| 2006/0182065 A1* | 8/2006 | Petrovic et al. | 370/332 |
| 2006/0209869 A1* | 9/2006 | Kim et al. | 370/431 |
| 2007/0127369 A1* | 6/2007 | Sebire | 370/229 |
| 2007/0258422 A1* | 11/2007 | Herrmann | 370/338 |
| 2008/0081651 A1* | 4/2008 | Kuroda et al. | 455/509 |
| 2008/0207251 A1* | 8/2008 | Anderson | 455/522 |
| 2008/0212524 A1* | 9/2008 | Niwano | 370/329 |
| 2008/0273502 A1* | 11/2008 | Zeira et al. | 370/332 |
| 2009/0028111 A1* | 1/2009 | Chao et al. | 370/331 |

FOREIGN PATENT DOCUMENTS

| | | | | |
|---|---|---|---|---|
| WO | WO 2005/112296 A2 | | 11/2005 | |
| WO | WO 2005112296 A2 * | | 11/2005 | H04B 7/00 |

OTHER PUBLICATIONS

3GPP TSG-RAN WG1 Conference Call; Jan. 20, 2005; R1-050002; Source: NTT DoCoMo; Title: Clarification of UE behaviour to RGCH from Non-serving cell on common and . . . .

Official Action Letter issued on May 13, 2008 in the counterpart Korean application.

Search report issued on Jun. 29, 2006 in the counterpart European applicaiton.

"3rd Generation Partnership Project; Technical Specification Group Radio Access Network; FDD Enhanced Uplink; Overall Description; Stage 2 (Release 6)", 3GPP TS 25.309 V6.1.0, Dec. 23, 2004, XP002385332.

Samsung, "RRM for E-DCH", 3GPP TSG RAN WG1 EUL Conference Call#2, Jan. 24, 2005, XP002385333.

Motorola, "Method for Node B Controlled Time and Rate Limit (Explicit) Scheduling," 3GPP TSG-RAN WG1 #32 meeting, Tdoc R1-03-0480, Paris, France, May 19-23, 2003.

* cited by examiner

RADIO RESOURCE CONTROL METHOD, RADIO BASE STATION, AND RADIO NETWORK CONTROLLER

CROSS REFERENCE TO RELATED APPLICATION

This application is based upon and claims the benefit of priority from the prior Japanese Patent Application No. P2005-049647, filed on Feb. 24, 2005; the entire contents of which are incorporated herein by reference.

BACKGROUND OF THE INVENTION

1. Field of the Invention

The present invention relates to a radio resource control method of controlling a radio resource for transmitting user data by a mobile station via an uplink, a radio base station, and a radio network controller.

2. Description of the Related Art

In a conventional mobile communication system, in an uplink from a mobile station UE to a radio base station Node B, a radio network controller RNC is configured to determine a transmission rate of a dedicated channel, in consideration of radio resources of the radio base station Node B, an interference volume in an uplink, transmission power of the mobile station UE, transmission processing performance of the mobile station UE, a transmission rate required for an upper application, and the like, and to notify the determined transmission rate of the dedicated channel by a message of a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

However, as shown in FIG. 1, the radio network controller RNC integrally controls a plurality of radio base stations Node B in general. Therefore, in the conventional mobile communication system, there has been a problem that it is difficult to perform fast control for changing of the transmission rate of channel (for example, per approximately 1 through 100 ms), due to processing load, processing delay, or the like.

In addition, in the conventional mobile communication system, there has been also a problem that costs for implementing an apparatus and for operating a network are substantially increased even if the fast control for changing of the transmission rate of the channel can be performed.

Therefore, in the conventional mobile communication system, control for changing of the transmission rate of the channel is generally performed on the order from a few hundred ms to a few seconds.

Accordingly, in the conventional mobile communication system, when burst data is generated as shown in FIG. 2 (a), the data are transmitted by accepting low-speed, high-delay, and low-transmission efficiency as shown in FIG. 2(b), or, as shown in FIG. 2(c), by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIGS. 2(b) and 2(c).

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the radio resources effectively. Such discussions or discussed functions will be hereinafter referred to as "Enhanced Uplink (EUL)".

Under the 3GPP standards, cells transmit grants of uplink resources to mobile stations. At any given time, each mobile station has one "serving cell" in a radio base station from which the mobile station receives "Absolute Grants" via AGCH. The Absolute Grant provides an absolute limitation on the maximum amount uplink resources that the mobile station UE may use.

A mobile station UE may also receive "Relative Grants" that increase or decrease the resource limitation compared to the previously used value. A mobile station may receive the Relative Grants via RGCH not only from its serving cell but also from non-serving cells.

A cell in a radio base station Node B regards a mobile station for which the cell is a serving cell as a serving mobile station. A radio link (E-DCH) established between the mobile station and the cell is called a serving radio link (a serving E-DCH).

On the other hand, a cell in a radio base station Node B regards a mobile station for which the cell is a non-serving cell as a non-serving mobile station. A radio link (E-DCH) established between the mobile station and the cell is called a non-serving radio link (a non-serving E-DCH).

Radio resource control methods that have been discussed in the "Enhanced Uplink" can be broadly categorized into three as follows. The radio resource control methods will be briefly described below.

First, a radio resource control method that is referred to as "Time & Rate Control" has been discussed.

In such a radio resource control method, a radio base station Node B determines a mobile station UE which can transmit user data and a transmission rate of user data per a predetermined timing, so as to signal information relating to a mobile station ID as well as the transmission rate of user data (or a maximum allowable transmission rate of user data).

The mobile station UE that is designated by the radio base station Node B transmits user data at the predetermined timing and the transmission rate (or within a range of the maximum allowable transmission rate).

Second, a radio resource control method that is referred to as "Rate Control per UE" has been discussed.

In such a radio resource control method, if there is user data that should be transmitted to the radio base station Node B, each mobile station UE can transmit the user data. However, the maximum allowable transmission rate of the user data, which is determined by the radio base station Node B and signaled to each mobile station UE for each transmission frame or each of a plurality of transmission frames, is used.

Here, when the maximum allowable transmission rate is signaled, the radio base station Node B signals the maximum allowable transmission rate itself, or a relative value thereof (for example, binary of Up command and Down command), at this timing.

Third, a radio resource control method that is referred to as "Rate Control per Cell" has been discussed.

In such a radio resource control method, a radio base station Node B signals a transmission rate of user data, which is common among mobile stations UE in communication, or information needed to calculate the transmission rate, and each mobile station UE determines a transmission rate of user data based on the received information.

Although a downlink control signal load and a transmission rate control load in the radio base station Node B or the like exist, as proposed in "Time & Rate Control" and "Rate Control per UE", to control the transmission rate of the each mobile station UE, respectively, can be a good control methods for improving radio capacity in an uplink.

The "Rate Control per UE" is configured to control the transmission rate of user data by using an "Absolute rate Grant Channel (AGCH)" and a "Relative rate Grant Channel (RGCH)".

By using the RGCH frequently, it is possible to simplify the control signals transmitted from the radio base station Node B for controlling the transmission rate of user data, and to reduce effects in a downlink, which is caused by the control signals.

The detailed performance of the transmission rate control using the RGCH, which includes three values of an "Up command", a "Down Command" and a "Hold Command", is described in Non-Patent literature 1 (3GPP TSG-RAN R1-050002).

As described in the Non-Patent literature 1, the method that instructs to increase, decrease or hold the last transmission rate of HARQ is common.

Here, as disclosed in the Non-Patent literature 1, by using the concepts of hysteresis and window, the mobile station UE receiving the RGCH from a non-serving cell integrates the "Down Command" included in the received RGCH by tracing back for a predetermined period, and is specified to add such an integrated value to the transmission rate at the time (or, a parameter relating to the transmission rate, or "transmission power ratio between data channel and control cannel" in the Non-Patent literature 1).

As disclosed in the Non-Patent literature 1, the mobile station UE is provided with the hysteresis and the window so as to prevent "ping-pong phenomena" in which transmission of the "Up Command" from the serving cell and transmission of the "Down Command" from the non-serving cell are repeated.

In addition, the radio network controller RNC performs radio resource control so as to perform call admission control, handover control, or the like.

Conventionally, the radio network controller RNC performs the call admission control or the handover control based on the interference volume in the uplink.

However, when the EUL is applied, the interference volume in the uplink is constantly controlled so as to approach the allowable value.

Therefore, there is a problem that the call admission control or the handover control can not be performed simply based on the state whether or not the interference volume in the uplink has a space.

To solve these problems, there is known a method that the radio network control RNC measures received power of the EUL channel (Enhanced Dedicated Physical Channel) to perform the call admission control, the handover control, or the like, based on the measured received power.

However, in the conventional radio resource control method, there is a problem that the radio network controller RNC cannot correctly grasp the maximum allowable transmission rate reflecting the reduction range of the maximum allowable transmission rate signaled by the radio base station Node B, and high-performance radio resource control cannot be performed.

BRIEF SUMMARY OF THE INVENTION

The present invention has been made considering the problems, and its object is to provide a radio resource control method in which high-performance radio resource control can be performed by correctly grasping radio communication quality reflecting the reduction range of the maximum allowable transmission rate signaled by a radio base station Node B, a radio base station, a radio network controller.

A first aspect of the present invention is summarized as a radio resource control method of controlling a radio resource for transmitting user data by a mobile station via an uplink, including: reporting, at a radio base station, a reduction range of a maximum allowable transmission rate of the user data signaled to the mobile station connected to the radio base station, to a radio network controller at a predetermined timing; and controlling, at the radio network controller, the radio resource based on the reported reduction range of the maximum allowable transmission rate.

In the first aspect, a non-serving cell in the radio base station can report the reduction range of the maximum allowable transmission rate of the user data signaled to the mobile station connected to the non-serving cell, to the radio network controller at the predetermined timing; and the mobile station can increase transmission rate of the user data up to the maximum allowable transmission rate.

A second aspect of the present invention is summarized as a radio base station used in a mobile communication system in which a mobile station automatically increases a transmission rate of user data to be transmitted via an uplink up to a maximum allowable transmission rate, the radio base station including: a maximum allowable transmission rate reduction range signaling section configured to signal a reduction range of the maximum allowable transmission rate to the mobile station connected to a non-serving cell in the radio base station; and a maximum allowable transmission rate reduction range reporting section configured to report the reduction range of the maximum allowable transmission rate signaled to the mobile station connected to the non-serving cell, to a radio network controller at a predetermined timing.

A third aspect of the present invention is summarized as a radio network controller used in a mobile communication system in which a mobile station automatically increases a transmission rate of user data to be transmitted via an uplink up to a maximum allowable transmission rate, the radio network controller including: a maximum allowable transmission rate reduction range acquiring section configured to acquire, from a non-serving cell, a reduction range of the maximum allowable transmission rate of the user data in the uplink signaled to the mobile station connected to the non-serving cell in a specific radio base station; and a radio resource control section configured to control a radio resource for transmitting the user data based on the acquired reduction range of the maximum allowable transmission rate.

A fourth aspect of the present invention is summarized as a radio resource control method of controlling a radio resource for transmitting user data by a mobile station via an uplink, including: sending, from a radio base station, a signal indicative of a reduction of a maximum allowable transmission rate of the user data signaled to the mobile station connected to the radio base station, to a radio network controller; and controlling, at the radio network controller, the radio resource based on the reported reduction of the maximum allowable transmission rate.

In the fourth aspect, a non-serving cell in the radio base station can report a reduction range of the maximum allowable transmission rate of the user data signaled to the mobile station connected to the non-serving cell, to the radio network controller.

In the fourth aspect, a non-serving cell in the radio base station can report a reduction range of the maximum allowable transmission rate of the user data signaled to the mobile station connected to the non-serving cell, to the radio network controller at the predetermined timing.

In the fourth aspect, a non-serving cell in the radio base station can report a reduction range of the maximum allowable transmission rate of the user data signaled to the mobile station connected to the non-serving cell, to the radio network controller at the predetermined timing; and the mobile station can increase transmission rate of the user data up to the maximum allowable transmission rate.

In the fourth aspect, a non-serving cell in the radio base station can report the reduction of the maximum allowable transmission rate of the user data signaled to the mobile station connected to the non-serving cell, to the radio network controller when the reduction becomes more than a predefined level.

In the fourth aspect, a non-serving cell in the radio base station can report the reduction of the maximum allowable transmission rate of the user data signaled to the mobile station connected to the non-serving cell, to the radio network controller when a frequency of "Down" commands towards the mobile station becomes more than a predefined level.

A fifth aspect of the present invention is summarized as a radio base station used in a mobile communication system in which a mobile station controls a transmission rate of user data to be transmitted via an uplink based on a maximum allowable transmission rate, the radio base station including: a maximum allowable transmission rate reduction signaling section configured to signal a reduction of the maximum allowable transmission rate to the mobile station connected to a non-serving cell in the radio base station; and a maximum allowable transmission rate reduction reporting section configured to send a signal of indicative of the reduction of the maximum allowable transmission rate signaled to the mobile station connected to the non-serving cell, to a radio network controller.

In the fifth aspect, the mobile station can automatically increase the transmission rate of user data to be transmitted via an uplink up to the maximum allowable transmission rate.

In the fifth aspect, the maximum allowable transmission rate reduction reporting section can be configured to report a reduction range of the maximum allowable transmission rate of the user data signaled to the mobile station connected to the non-serving cell, to the radio network controller.

In the fifth aspect, the maximum allowable transmission rate reduction reporting section can be configured to report a reduction range of the maximum allowable transmission rate of the user data signaled to the mobile station connected to the non-serving cell, to the radio network controller at the predetermined timing.

In the fifth aspect, the maximum allowable transmission rate reduction reporting section can be configured to report the reduction of the maximum allowable transmission rate of the user data signaled to the mobile station connected to the non-serving cell, to the radio network controller when the reduction becomes more than a predefined level.

In the fifth aspect, the maximum allowable transmission rate reduction reporting section can be configured to report the reduction of the maximum allowable transmission rate of the user data signaled to the mobile station connected to the non-serving cell, to the radio network controller when a frequency of "Down" commands towards the mobile station becomes more than a predefined level.

A sixth aspect of the present invention is summarized as a radio network controller used in a mobile communication system in which a mobile station controls a transmission rate of user data to be transmitted via an uplink based on a maximum allowable transmission rate, the radio network controller including: a maximum allowable transmission rate reduction acquiring section configured to acquire, from a non-serving cell, a signal indicative of a reduction of the maximum allowable transmission rate of the user data in the uplink signaled to the mobile station connected to the non-serving cell in a specific radio base station; and a radio resource control section configured to control a radio resource for transmitting the user data based on the acquired signal indicative of the reduction of the maximum allowable transmission rate.

In the sixth aspect, the mobile station can automatically increase the transmission rate of user data to be transmitted via an uplink up to the maximum allowable transmission rate.

In the sixth aspect, the maximum allowable transmission rate reduction acquiring section can be configured to acquire, from the non-serving cell, a report of a reduction range of the maximum allowable transmission rate of the user data in the uplink signaled to the mobile station connected to the non-serving cell in a specific radio base station.

In the sixth aspect, the maximum allowable transmission rate reduction acquiring section can be configured to acquire, from the non-serving cell at a predetermined timing, a report of a reduction range of the maximum allowable transmission rate of the user data in the uplink signaled to the mobile station connected to the non-serving cell in a specific radio base station.

In the sixth aspect, the maximum allowable transmission rate reduction acquiring section can be configured to acquire, from the non-serving cell, a report of the reduction of the maximum allowable transmission rate of the user data in the uplink signaled to the mobile station connected to the non-serving cell in a specific radio base station when the reduction becomes more than a predefined level.

In the sixth aspect, the maximum allowable transmission rate reduction acquiring section can be configured to acquire, from the non-serving cell, a report of the reduction of the maximum allowable transmission rate of the user data in the uplink signaled to the mobile station connected to the non-serving cell in a specific radio base station when a frequency of "Down" commands towards the mobile station becomes more than a predefined level.

In the sixth aspect, the signal can be sent to the radio network controller at a predetermined timing interval.

In the sixth aspect, the maximum allowable transmission rate reduction reporting section can be configured to send the reduction to the radio network controller at a predetermined timing interval.

A seventh aspect of the present invention is summarized as a radio resource control method of controlling a radio resource for transmitting user data by a mobile station via an uplink, including: reporting, at a radio base station, a radio communication quality of the mobile station under control of each cell in the radio base station, to a radio network controller; and controlling, at the radio network controller, the radio resource based on the reported radio communication quality.

In the seventh aspect, the radio communication quality can reflect a reduction range of a maximum allowable transmission rate of the user data signaled to the mobile station connected to the radio base station.

In the seventh aspect, a non-serving cell in the radio base station can report the reduction range of the maximum allowable transmission rate of the user data signaled to the mobile station connected to the non-serving cell, to the radio network controller at the predetermined timing.

An eighth aspect of the present invention is summarized as a radio base station used in a mobile communication system in which a mobile station controls a transmission rate of user data to be transmitted via an uplink based on a maximum allowable transmission rate, the radio base station including: a maximum allowable transmission rate reduction signaling section configured to signal a radio communication quality of the mobile station under control of each cell in the radio base station, to the mobile station connected to a non-serving cell in the radio base station; and a maximum allowable transmission rate reduction reporting section configured to report the radio communication quality, to a radio network controller.

In the eighth aspect, the radio communication quality can reflect a reduction range of a maximum allowable transmission rate of the user data signaled to the mobile station connected to the radio base station.

In the eighth aspect, the maximum allowable transmission rate reduction reporting section can be configured to report the reduction range, to a radio network controller at a predetermined timing.

In the eighth aspect, the mobile station can automatically increase the transmission rate of user data to be transmitted via an uplink up to the maximum allowable transmission rate.

A ninth aspect of the present invention is summarized as a radio network controller used in a mobile communication system in which a mobile station controls a transmission rate of user data to be transmitted via an uplink based on a maximum allowable transmission rate, the radio network controller including: a maximum allowable transmission rate reduction acquiring section configured to acquire a radio communication quality of the mobile station under control of a non-serving cell in a specific radio base station; and a radio resource control section configured to control a radio resource for transmitting the user data based on the acquired radio communication quality.

In the ninth aspect, the radio communication quality can reflect a reduction range of a maximum allowable transmission rate of the user data signaled to the mobile station connected to the radio base station.

In the ninth aspect, the mobile station can automatically increases the transmission rate of user data to be transmitted via an uplink up to the maximum allowable transmission rate.

DETAILED DESCRIPTION OF THE INVENTION

Configuration of Mobile Communication System According to First Embodiment of the Present Invention Referring to FIGS. 3 to 10, a configuration of a mobile communication system according to a first embodiment of the present invention will be described.

Figure 1:
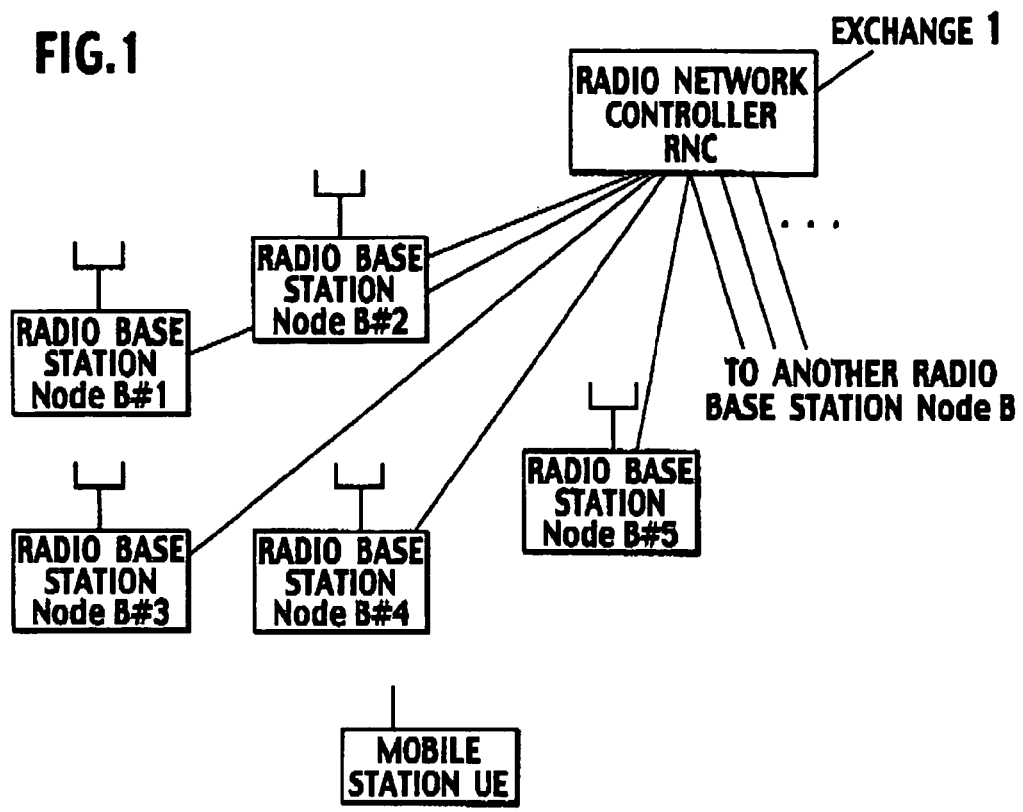
FIG. 1 is diagram of an entire configuration of a general mobile communication system.
Figure 2:
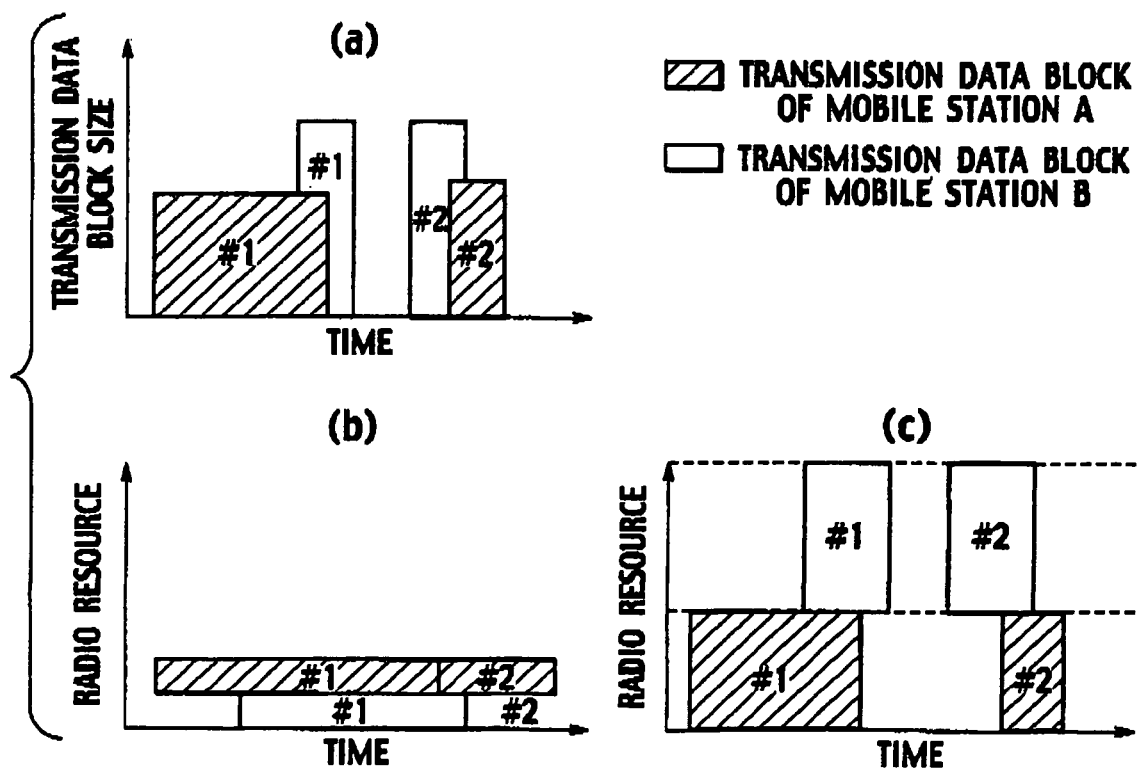
FIGS. 2(a) to 2(c) are graphs illustrating operations at the time of burst data transmission in a conventional mobile communication system.

It should be noted that, as shown in FIG. 1, the mobile communication system according to this embodiment is provided with a plurality of radio base stations Node B #1 to Node B #5 and a radio network controller RNC.

The mobile communication system according to this embodiment is configured to determine a transmission rate of user data to be transmitted by a mobile station UE via an uplink, based on the maximum allowable transmission rate.

In addition, in the mobile communication system according to this embodiment, a "High Speed Downlink Packet Access (HSDPA)" is used in a downlink, and an "Enhanced Uplink (EUL)" is used in an uplink.

It should be noted that in both of the HSDPA and the EUL, retransmission control (N process stop and wait) shall be performed by a "Hybrid Automatic Repeat Request (HARQ)".

Therefore, in an uplink, an "Enhanced Dedicated Physical Channel (E-DPCH)" configured of an "Enhanced Dedicated Physical Data Channel (E-DPDCH)" and an "Enhanced Dedicated Physical Control Channel (E-DPCCH)", and a "Dedicated Physical Channel (DPCH)" configured of a "Dedicated Physical Date Channel (DPDCH)" and a "Dedicated Physical Control Channel (DPCCH)" are used.

Here, the E-DPCCH transmits control data for the EUL such as a transmission format number for defining a transmission format (transmission block size, or the like) of the EDPDCH, HARQ related information (the number of retransmission, or the like), and scheduling related information (transmission power, buffer residence-volume, or the like in the mobile station UE).

In addition, the E-DPDCH is paired with the E-DPCCH, and transmits user data for the mobile station UE based on the control data for the EUL transmitted through the E-DPCCH.

The DPCCH transmits control data such as a pilot symbol that is used for RAKE combining, SIR measurement, or the like, a Transport Format Combination Indicator (TFCI) for identifying a transmission format of uplink DPDCH, and a downlink power control bit in a downlink.

In addition, the DPDCH is paired with the DPCCH, and transmits user data for the mobile station UE based on the control data transmitted through the DPCCH. However, if user data that should be transmitted does not exist in the mobile station UE, the DPDCH can be configured not to be transmitted.

In addition, in the uplink, a "High Speed Dedicated Physical Control Channel (HS-DPCCH)" which are needed when the HSPDA is applied is also used.

The HS-DPCCH transmits a Channel Quality Indicator (CQI) measured in a downlink and an acknowledge signal (Ack or Nack) for the HS-DPCCH.

Figure 3:
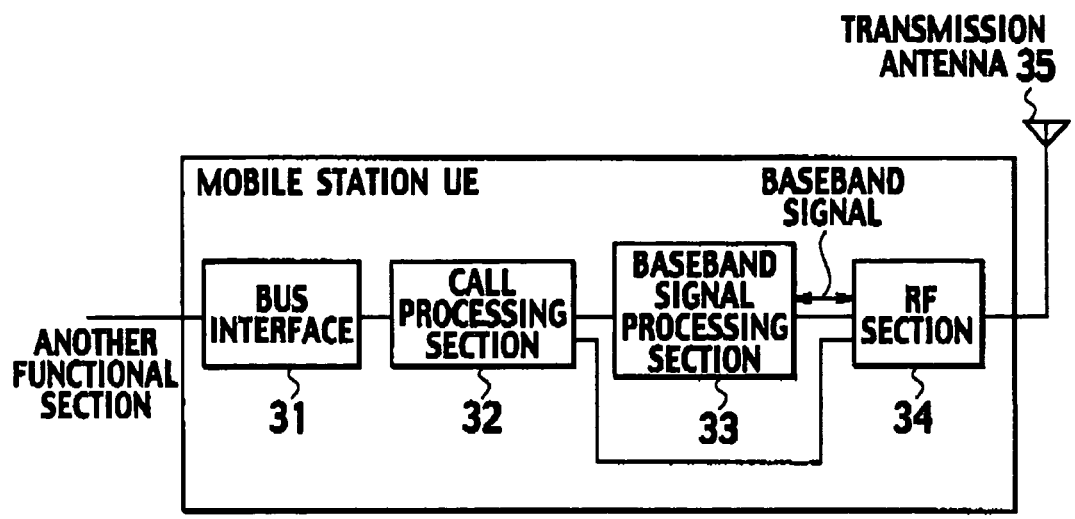
FIG. 3 is a functional block diagram of a mobile station in the mobile communication system according to an embodiment of the present invention.

As shown in FIG. 3, the mobile station UE according to this embodiment is provided with a bus interface 31, a call processing section 32, a baseband processing section 33, a radio frequency (RF) section 34, and a transmission-reception antenna 35.

However, these functions can be independently present as hardware, and can be partly or entirely integrated, or can be configured through a process of software.

The bus interface 31 is configured to forward the user data output from the call processing section 32 to another functional section (for example, an application related functional section).

In addition, the bus interface 31 is configured to forward the user data transmitted from another functional section (for example, the application related functional section) to the call processing section 32.

The call processing section 32 is configured to perform a call control processing for transmitting and receiving the user data.

The baseband signal processing section 33 is configured to transmit the user data to the call processing section 32, the user data acquired by performing, against the baseband signals transmitted from the RF section 34, a layer-1 processing including a despreading processing, a RAKE combining processing, and a "Forward Error Correction (FEC)" decode processing, a "Media Access Control (MAC)" processing including a MAC-e processing and a MAC-d processing, and a "Radio Link Control (RLC)" processing.

In addition, the baseband signal processing section 33 is configured to generate the baseband signals by performing the RLC processing, the MAC processing, or the layer-1 processing against the user data transmitted from the call processing section 32 so as to transmit the baseband signals to the RF section 34.

Detailed description of the functions of the baseband signal processing section 33 will be given later.

The RF section 34 is configured to generate baseband signals by performing the detection processing, the filtering processing, the quantization processing, or the like against radio frequency signals received through the transmission-reception antenna 35, so as to transmit the generated baseband signals to the baseband signal processing section 33.

In addition, the RF section 34 is configured to convert the baseband signals transmitted from the baseband signal processing section 33 to the radio frequency signals.

Figure 4:
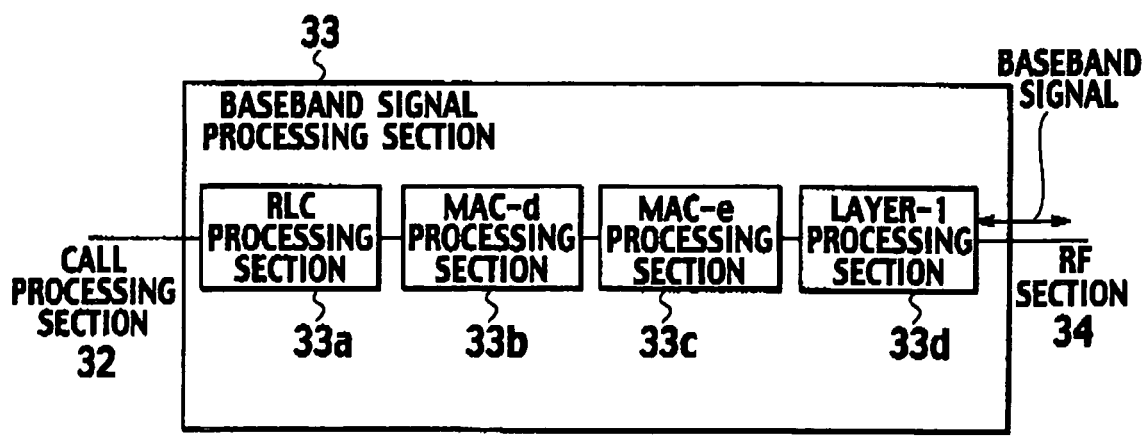
FIG. 4 is a functional block diagram of a baseband signal processing section of the mobile station in the mobile communication system according to the embodiment of the present invention.

As shown in FIG. 4, the baseband signal processing section 33 is provided with a RLC processing section 33a, a MAC-d processing section 33b, a MAC-e processing section 33c, and a layer-1 processing section 33d.

The RLC processing section 33a is configured to transmit, to the MAC-d processing section 33b, the user data transmitted from the call processing section 32 by performing a processing (RLC processing) in an upper layer of a layer-2 against the user data.

The MAC-d processing section 33b is configured to grant a channel identifier header, and to create a transmission format in the uplink based on the limitation of transmission power in the uplink.

Figure 5A:
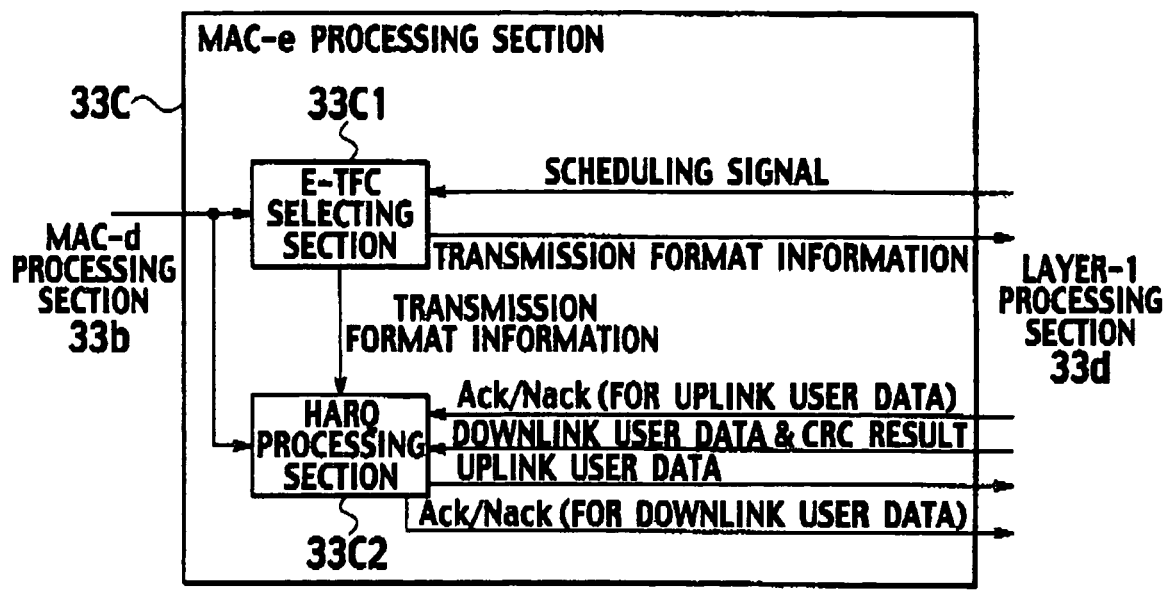
FIGS. 5A and 5B are a functional block diagrams of a MAC-e processing section of the baseband signal processing section in the mobile station of the mobile communication system according to the embodiment of the present invention.

As shown in FIG. 5A, the MAC-e processing section 33c is provided with an Enhanced Transport Format Combination (E-TFC) selecting section 33c1 and an HARQ controlling section 33c2.

The E-TFC selecting section 33c1 is configured to determine a transmission format (E-TFC) of the E-DPDCH and the E-DPCCH, based on scheduling signals transmitted from the radio base station Node B.

In addition, the E-TFC selecting section 33c1 is configured to transmit transmission format information on the determined transmission format (that is, a transmission data block size, an transmission power ratio between the E-DPDCH and the DPCCH, or the like) to the layer-1 processing section 33d, and also to transmit the determined transmission data block size or the transmission power ratio to the HARQ controlling section 33c2.

Here, the scheduling signals include the maximum allowable transmission rate of user data in the mobile station UE (for example, the maximum allowable transmission data block size, a maximum value of the transmission power ratio between the E-DPDCH and the DPCCH (maximum allowable transmission power ratio), or the like), or a parameter relating to the maximum allowable transmission rate.

Unless particularly described in this specification, the maximum allowable transmission rate includes a parameter relating to the maximum allowable transmission rate.

Such a scheduling signal is information that is signaled in the cell where the mobile station UE is located, and includes control information for all the mobile stations located in the cell, or a specific group of the mobile stations located in the cell.

Here, the E-TFC selecting section 33c1 is configured to increase the transmission rate of user data in the uplink up to the maximum allowable transmission rate notified by the scheduling signals from the radio base station Node B.

At the time of setting up a connection, the E-TFC selecting section 33c1 is notified from the radio network controller RNC of a time width T1 associated with the RGCH from the non-serving cell.

When the mobile station is connected to a cell (non-serving cell) other than a serving sell set, the mobile station UE is configured to receive the RGCH from the non-serving cell. Here, it is considered that the RGCH can be configured of binary of "Down Command" and "Don't care Command", percentage, or the like.

The E-TFC selecting section 33c1 stores the received RGCH in a sliding window having the time width T1. Here, such sliding window is configured to occasionally slide (see, FIG. 5B).

Figure 5B:
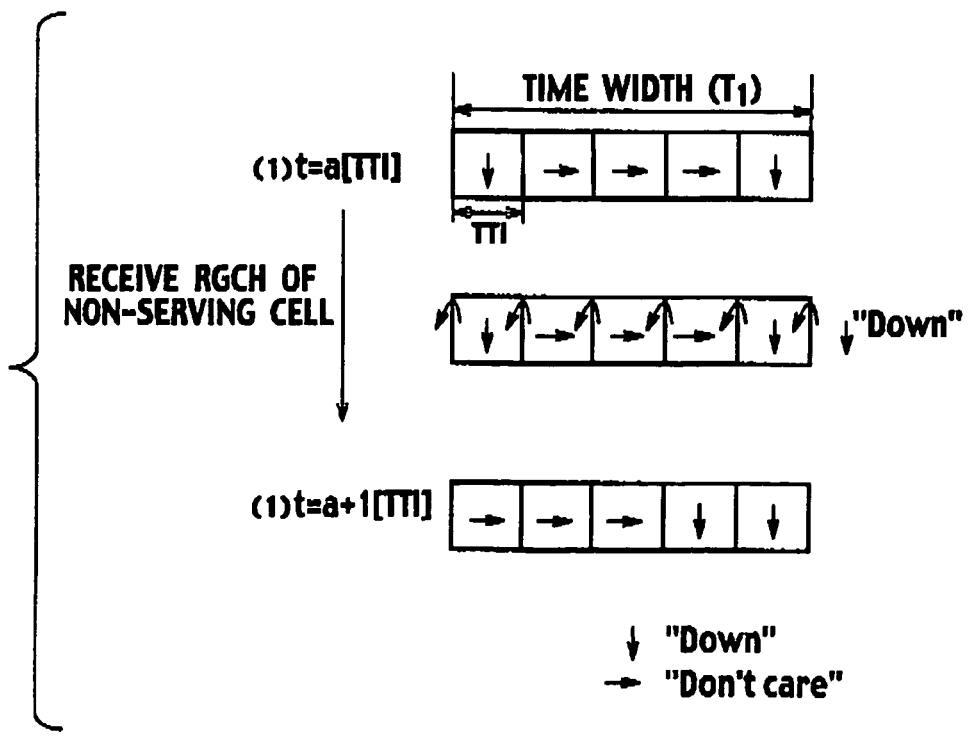

As shown in FIG. 5B, the E-TFC selecting section 33c1 receives any of "Down Command" and "Don't care Command" per Transmission Time Interval (TTI), and determines a relative value (reduction range) of the maximum allowable transmission rate included in the RGCH from the non-serving cell, by integration using the sliding window.

For example, in FIG. 5B, when the reduction range shown by a "Down command" is "1 dB", the relative value (reduction range) of the maximum allowable transmission rate means "2 dB" in both cases of t=a [TTI] and t=a+1 [TTI].

In addition, when the reduction range shown by one "Down command" is "20%", the relative value (reduction range) of the maximum allowable transmission rate means "40%" in both cases of t=a [TTI] and t=a+1 [TTI].

In addition, since the "Down command" exists in the sliding window in both TTIs, the E-TFC selecting section 33c1 controls the transmission rate of uplink user data without considering the "Up Command" from the serving cell set.

In addition, even if the "Down Command" comes from the serving cell set, the "Down Command" becomes nullified since the "Down Command" exists in the sliding window.

The HARQ controlling section 33c2 is configured to perform process control for the "N process stop and wait", so as to transmit the user data in the uplink based on an acknowledge signal (Ack/Nack for uplink data) transmitted from the radio base station Node B.

Specifically, the HARQ processing section 33c2 is configured to determine whether or not the receive processing of downlink user data has been successful based on the result of the "Cyclic Redundancy Check (CRC)" entered from the first layer processing section 33d.

Then, the HARQ processing section 33c2 is configured to generate an acknowledge signal (Ack/Nack for downlink user data) based on the determined result, so as to transmit the acknowledge signal to the layer-1 processing section 33d.

In addition, the HARQ processing section 33c2 is configured to transmit, to the MAC-d processing 33b, the downlink user data entered from the layer-1 processing section 33d when the above-described determination result has been successful.

Figure 6:
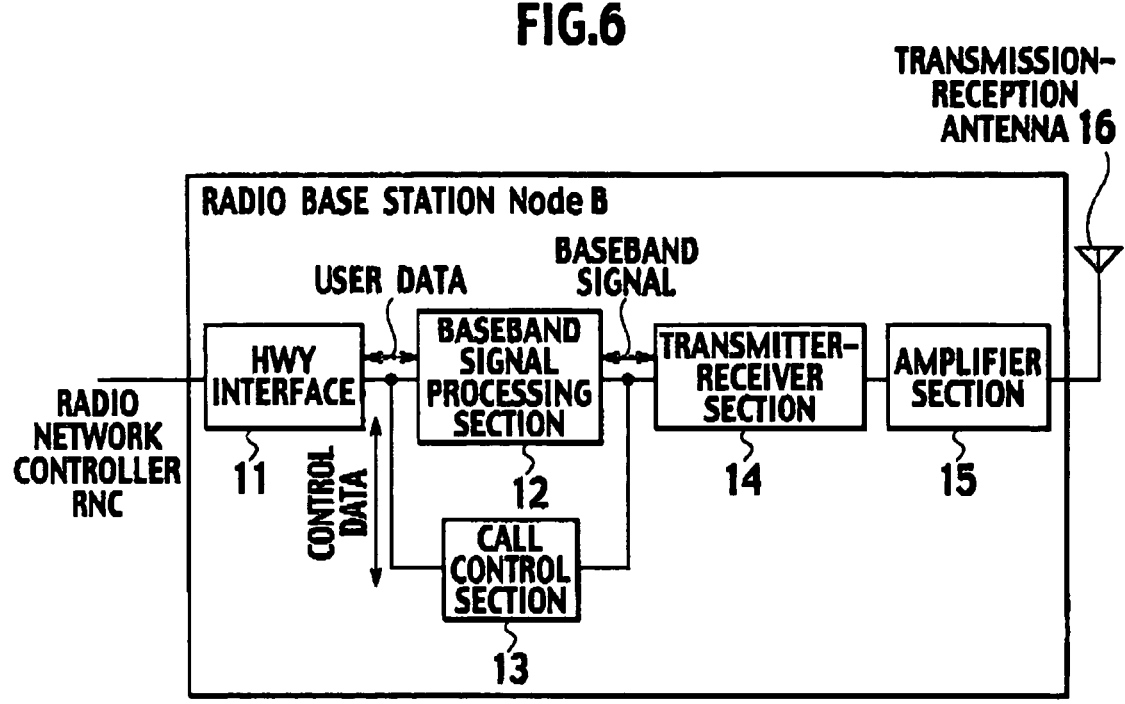
FIG. 6 is a functional block diagram of a radio base station of the mobile communication system according to the embodiment of the present invention.

As shown in FIG. 6, the radio base station Node B according to this embodiment is provided with an HWY interface 11, a baseband signal processing section 12, a call control section 13, at least one transmitter-receiver section 14, at least one amplifier section 15, and at least one transmission-reception antenna 16.

The HWY interface 11 is an interface with a radio network controller RNC. Specifically, the HWY interface 11 is configured to receive user data transmitted from the radio network controller RNC to a mobile station UE via a downlink, so as to enter the user data to the baseband signal processing section 12.

In addition, the HWY interface 11 is configured to receive control data for the radio base station Node B from the radio network controller RNC, so as to enter the received control data to the call control section 13.

In addition, the HWY interface 11 is configured to acquire, from the baseband signal processing section 12, the user data included in the uplink signals which are received from a mobile station UE via an uplink, so as to transmit the acquired user data to the radio network controller RNC.

Further, the HWY interface 11 is configured to acquire the control data for the radio network controller RNC from the call control section 13, so as to transmit the acquired control data to the radio network controller RNC.

The baseband signal processing section 12 is configured to generate baseband signals by performing the MAC-e processing and the layer-1 processing against the user data acquired from the HWY interface 11, so as to forward the generated baseband signals to the transmitter-receiver section 14.

Here, the MAC-e processing in the downlink includes an HARQ processing, a scheduling processing, a transmission rate control processing, or the like.

In addition, the layer-1 processing in the downlink includes a channel coding processing of user data, a spreading processing, or the like.

In addition, the baseband signal processing section 12 is configured to extract user data by performing the layer-1 processing and the MAC-e processing against the baseband signals acquired from the transmitter-receiver section 14, so as to forward the extracted user data to the HWY interface 11.

Here, the MAC-e processing in the uplink includes the HARQ processing, the scheduling processing, the transmission rate control processing, a header disposal processing, or the like.

In addition, the layer-1 processing in the uplink includes the despreading processing, the RAKE combining processing, the error correction decode processing, or the like.

Detailed description of the functions of the baseband signal processing section 12 will be given later.

In addition, the call control section 13 is configured to perform the call control processing, based on the control data acquired from the HWY interface 11.

For example, the call control section 13 is configured to report, in response to a reduction range reporting request that is transmitted from the radio network controller RNC, the reduction range (the reduction range shown by the "Down Command") of the last maximum allowable transmission rate (maximum allowable transmission data block size or the maximum allowable transmission power ratio) that is signaled to the mobile station UE connecting to the cell under the control thereof.

It should be noted that the call control section 13 can be configured to report the reduction range of the maximum allowable transmission rate in response to a predetermined trigger, or can be configured to report the reduction range of the maximum allowable transmission rate in a predetermined time cycle.

For example, the call control section 13 can be configured to report a load excess indicator to the radio network controller RNC, if the frequency of the "Down Commands" towards the non-serving mobile stations UE becomes more than a predefined level. The load excess indicator signals a reduction of the maximum allowable transmission rate of uplink user data.

The transmitter-receiver section 14 is configured to perform processing of converting baseband signals, which are acquired from the baseband signal processing section 12, to radio frequency signals (downlink signals), so as to transmit the radio frequency signals to the amplifier section 15.

In addition, the transmitter-receiver 14 is configured to perform processing of converting the radio frequency signals (uplink signals), which are acquired from the amplifier section 15, to the baseband signals, so as to transmit the baseband signals to the baseband signal processing section 12.

The amplifier section 15 is configured to amplify the downlink signals acquired from the transmitter-receiver section 14, so as to transmit the amplified downlink signals to the mobile station UE via the transmission-reception antenna 16.

In addition, the amplifier 15 is configured to amplify the uplink signals received by the transmission-reception antenna 16, so as to transmit the amplified uplink signals to the transmitter-receiver section 14.

Figure 7:
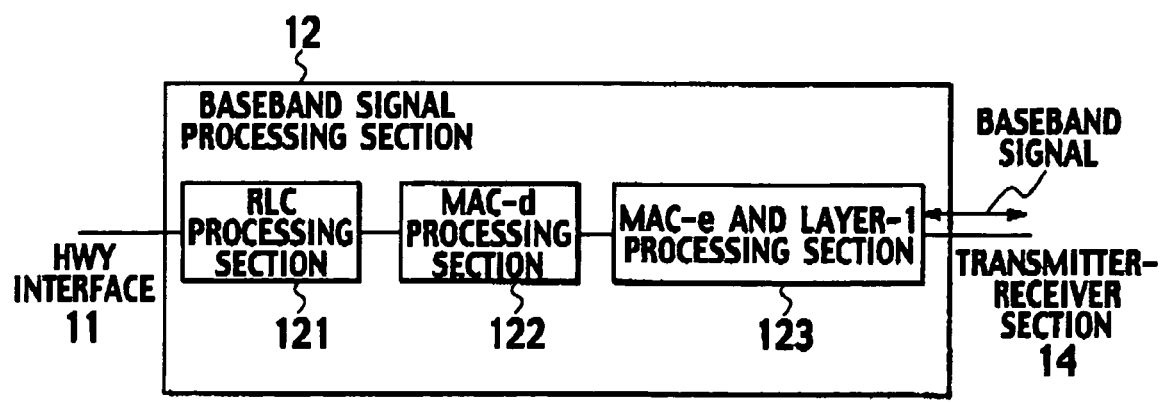
FIG. 7 is a functional block diagram of the baseband processing section in the radio base station of the mobile communication system according to the embodiment of the present invention.

As shown in FIG. 7, the baseband signal processing section 12 is provided with a RLC processing section 121, a MAC-d processing section 122, and a MAC-e and first layer processing section 123.

The MAC-e and layer-1 processing section 123 is configured to perform, against the baseband signals acquired from the transmitter-receiver section 14, the despreading processing, the RAKE combining processing, the error correction decode processing, the HARQ processing, or the like.

The MAC-d processing section 122 is configured to perform a disposal processing of header against output signals from the MAC-e and layer-1 processing section 123.

The RLC processing section 121 is configured to perform, against the output signals from the MAC-d processing section 122, the retransmission control processing in the RLC layer or the reestablishment processing of RLC-Service Data Section (SDU).

However, these functions are not clearly divided per hardware, and can be obtained by software.

Figure 8:
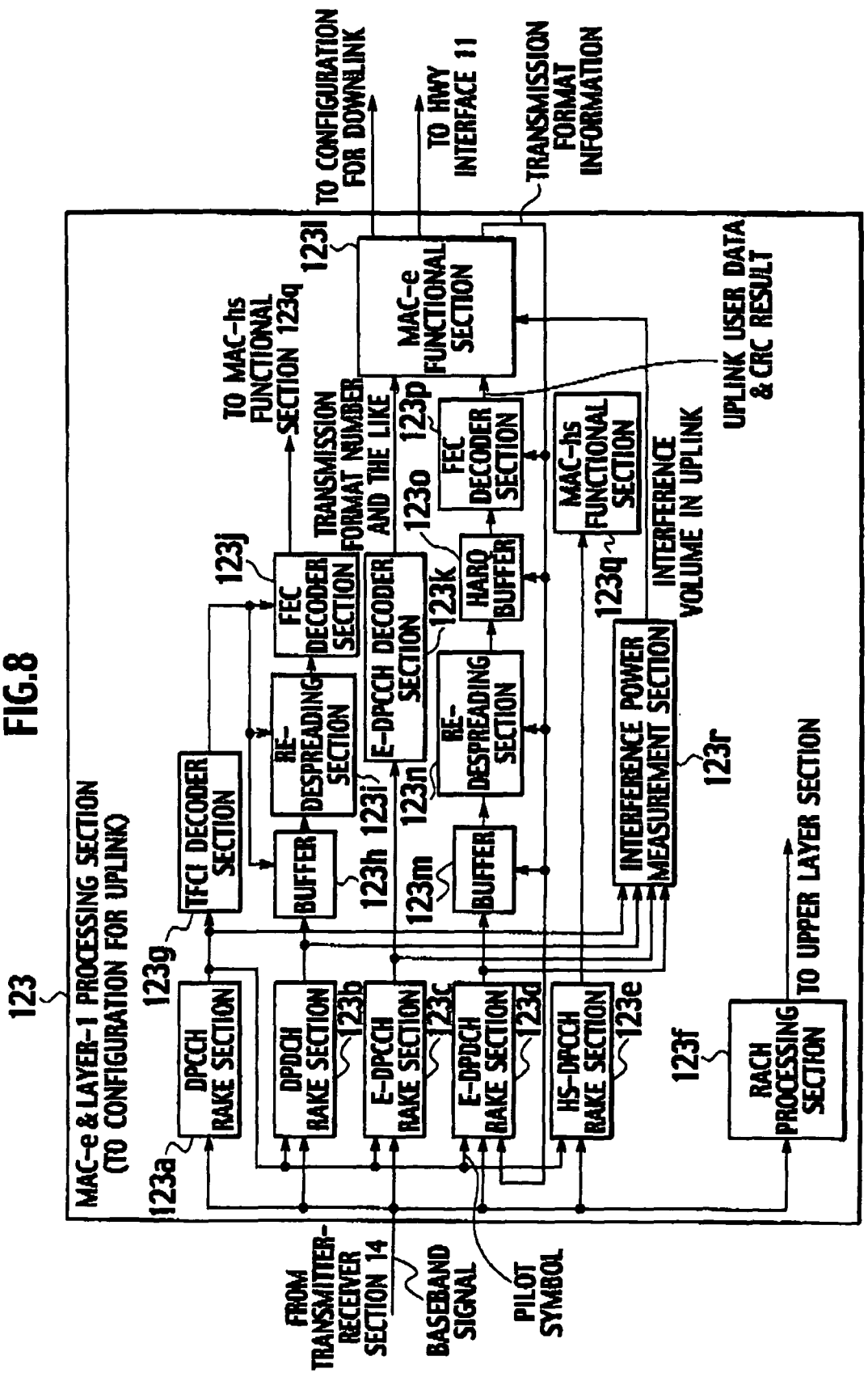
FIG. 8 is a functional block diagram of the MAC-e and layer-1 processing section (configured for an uplink) in the baseband signal processing section in the radio base station of the communication system according to the embodiment of the present invention.

As shown in FIG. 8, the MAC-e and layer-1 processing section (configuration for the uplink) 123 is provided with a DPCCH RAKE section 123a, a DPDCH RAKE section 123b, an E-DPCCH RAKE section 123c, an E-DPDCH RAKE section 123d, an HS-DPCCH RAKE section 123e, a RACH processing section 123f, a Transport Format Combination Indicator (TFCI) decoder section 123g, buffers 123h and 123m, re-despreading sections 123i and 123n, FEC decoder sections 123j and 123p, an E-DPCCH decoder section 123k, a MAC-e functional section 123l, an HARQ buffer 123o, a MAC-hs functional section 123q, and an interference power measurement section 123r.

The E-DPCCH RAKE section 123c is configured to perform, against the E-DPCCH in the baseband signals transmitted from the transmitter-receiver section 14, the despreading processing, and the RAKE combining processing using a pilot symbol included in the DPCCH.

The E-DPCCH decoder section 123k is configured to acquire transmission format number related information, HARQ related information, scheduling related information, or the like, by performing the decode processing against the RAKE combining outputs of the E-DPCCH RAKE section 123c, so as to enter the information to the MAC-e functional section 123l.

The E-DPDCH RAKE section 123d is configured to perform, against the E-DPDCH in the baseband signals transmitted from the transmitter-receiver section 14, the despreading processing using the transmission format information (the number of codes) transmitted from the MAC-e functional section 123l and the RAKE combining processing using the pilot symbol included in the DPCCH.

The buffer 123m is configured to store the RAKE combining outputs of the E-DPDCH RAKE section 123d based on the transmission format information (the number of symbols) transmitted from the MAC-e functional section 123l.

The re-despreading section 123n is configured to perform the despreading processing against the RAKE combining outputs of the E-DPDCH RAKE section 123d which is stored in the buffer 123m, based on the transmission format information (spreading factor) transmitted from the MAC-e functional section 123l.

The HARQ buffer 123o is configured to store the despreading processing outputs of the re-despreading section 123n, based on the transmission format information transmitted from the MAC-e functional section 123l.

The FEC decoder section 123p is configured to perform an error correction decode processing (the FEC decoding processing) against the despreading processing outputs of the re-despreading section 123n, which is stored in the HARQ buffer 123o, based on the transmission format information (transmission data block size) transmitted from the MAC-e functional section 123l.

The interference power measurement section 123r is configured to measure an interference volume (noise rise) in the uplink such as interference power by a mobile station UE of which the radio base station Node B provides service, and the entire interference power.

Here, the noise rise is a ratio between the interference power in a predetermined channel within a predetermined frequency and noise power (thermal noise power or noise power from the outside of the mobile communication system) within the predetermined frequency (i.e., a receiving signal level from a noise floor).

In other words, the noise rise is a received interference power offset that a receiving level in communication has against a receiving level (noise floor) in non-communication.

The MAC-e functional section 123l is configured to calculate and output the transmission format information (the number of codes, the number of symbols, spreading factor, transmission data block size, and the like) based on the transmission format number related information, the HARQ related information, the scheduling related information, and the like, which are acquired from the E-DPCCH decoder section 123k.

Figure 9:
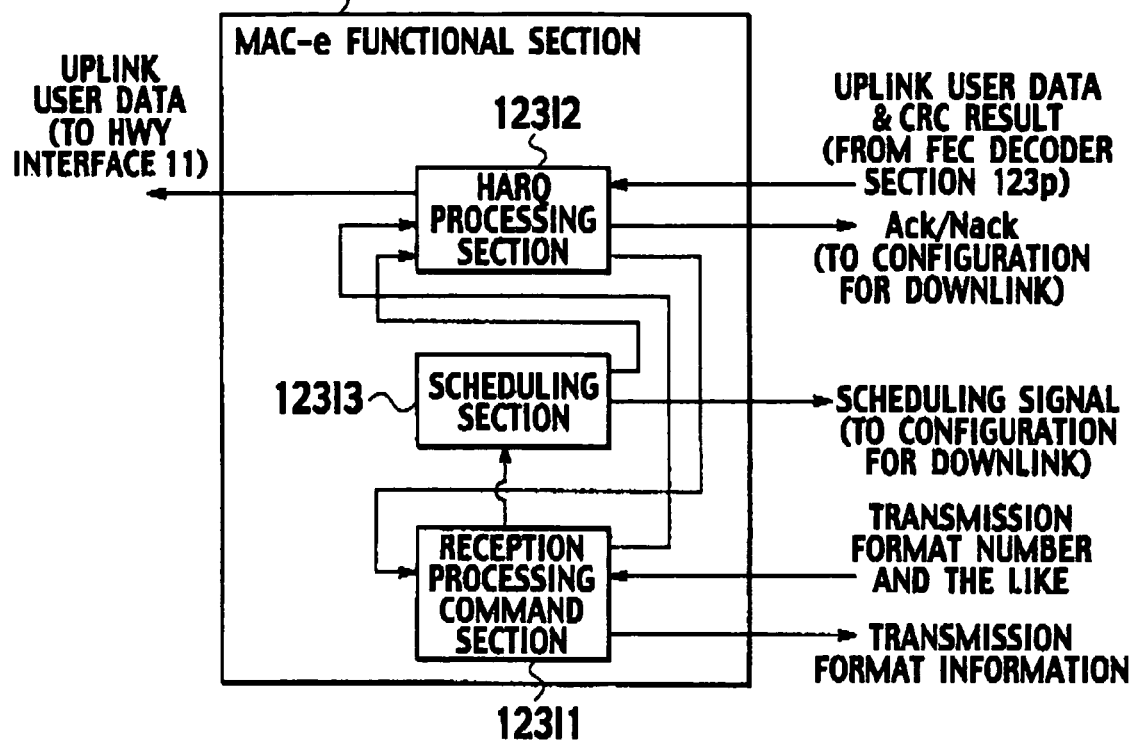
FIG. 9 is a functional block diagram of a MAC-e functional section of the MAC-e and layer-1 processing section (configured for the uplink) in the baseband signal processing section in the radio base station of the mobile communication system according to the embodiment of the present invention.

In addition, as shown in FIG. 9, the MAC-e functional section 123l is provided with a receive processing command section 123l1, an HARQ controlling section 123l2, and a scheduling section 123l3.

The receive processing command section 123l1 is configured to transmit the transmission format number related information, the HARQ related information, and the scheduling related information, which are entered from the E-DPCCH decoder section 123k, to the HARQ controlling section 123l2.

In addition, the receive processing command section 123l1 is configured to transmit, to the scheduling section 123l3, the scheduling related information entered form the E-DPCCH decoder section 123k.

Further, the receive processing command section 123l1 is configured to output the transmission format information corresponding to the transmission format number entered from the E-DPCCH decoder section 123k.

The HARQ controlling section 123l2 is configured to determine whether or not the receive processing of uplink user data has been successful, based on the CRC result entered from the FEC decoder section 123p.

Then, the HARQ controlling section 123l2 is configured to generate an acknowledge signal (Ack or Nack), based on the determined result, so as to transmit the generated acknowledge signal to the configuration for the downlink of the baseband signal processing section 12.

In addition, the HARQ controlling section 123l2 is configured to transmit the uplink user data entered from the FEC decoder section 123p to the radio network controller RNC, when the above-described determined result has been successful.

In addition, the HARQ controlling section 123l2 is configured to clear soft decision values stored in the HARQ buffer 123o, when the above-described determined result has been successful.

On the other hand, the HARQ controlling section 123l2 is configured to store, in the HARQ buffer 123o, the uplink user data, when the above-described determined result has not been successful.

In addition, the HARQ controlling section 123/2 is configured to forward the above-described determined result to the receive processing command section 123/1.

The receive processing control command section 123/1 is configured to notify the E-DPDCH RAKE section 123d and the buffer 123m of an hardware resource that should be prepared for the following transmission time interval (TTI), based on the received determined result, so as to perform notification for reserving the resource in the HARQ buffer 123o.

In addition, when the uplink user data is stored in the buffer 123m, the receive processing command section 123/1 is configured to designate the HARQ buffer 123o and the FEC decoder section 123p to perform the FEC decoding processing after adding the uplink user data, which is stored in the HARQ buffer 123o, in a process corresponding to the TTI and a newly received uplink user data, per TTI.

In addition, the scheduling section 123/3 is configured to designate the configuration for the downlink of the baseband signal processing section 12 so as to notify the scheduling signals including the maximum allowable transmission rate (maximum allowable transmission data block size, maximum allowable transmission power ratio, or the like), based on radio resources in the uplink of the radio base station Node B, interference volume (noise rise) in the uplink, or the like.

Specifically, the scheduling section 123/3 is configured to determine the maximum allowable transmission rate based on the scheduling related information (radio resources in the uplink) transmitted from the E-DPCCH decoder section 123k or the interference volume in the uplink transmitted from the interference power measurement section 123r, so as to control the transmission rate of user data in a communicating mobile station (a serving mobile station).

In addition, the scheduling section 123/3 is configured to determine the reduction range (i.e., relative value of the maximum allowable transmission rate transmitted by the RGCH) of the above-described maximum allowable transmission rate based on the interference volume in the uplink from the interference power measurement section 123r, and to control the transmission rate of user data in the communicating mobile station (serving mobile station or non-serving mobile station).

The radio network controller RNC according to this embodiment is an apparatus located in an upper level of the radio base station Node B, and is configured to control radio communications between the radio base station Node B and the mobile station UE.

Figure 10:
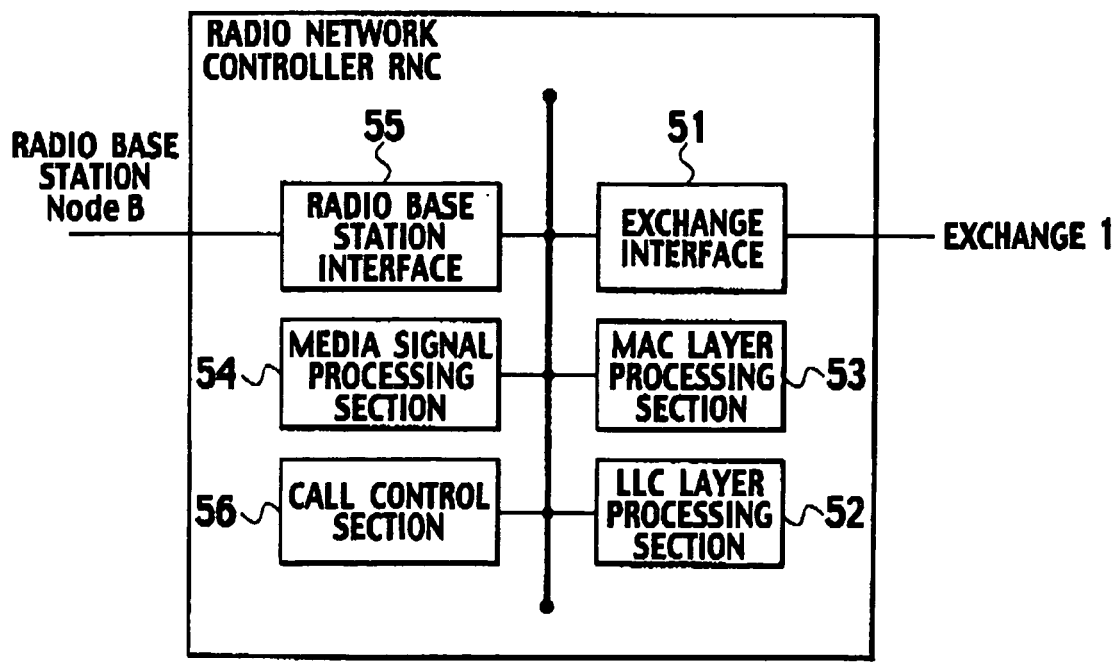
FIG. 10 is a functional block diagram of a radio network controller of the mobile communication system according to the embodiment of the present invention.

As shown in FIG. 10, the radio network controller RNC according to this embodiment is provided with an exchange interface 51, a Logical Link Control (LLC) layer processing section 52, a MAC layer processing section 53, a media signal processing section 54, a radio base station interface 55, and a call control section 56.

The exchange interface 51 is an interface with an exchange 1, and is configured to forward the downlink signals transmitted from the exchange 1 to the RLC layer processing section 52, and to forward the uplink signals transmitted from the RLC layer processing section 52 to the exchange 1.

The LLC layer processing section 52 is configured to perform an LLC (Logical Link Control) sub-layer processing such as a combining processing of a header such as a sequence number or a trailer.

The LLC layer processing section 52 is also configured to transmit the uplink signals to the exchange interface 51 and to transmit the downlink signals to the MAC layer processing section 53, after the LLC sub-layer processing is performed.

The MAC layer processing section 53 is configured to perform a MAC layer processing such as a priority control processing or a header granting processing.

The MAC layer processing section 53 is also configured to transmit the uplink signals to the RLC layer processing section 52 and to transmit the downlink signals to the radio base station interface 55 (or a media signal processing section 54), after the MAC layer processing is performed.

The media signal processing section 54 is configured to perform a media signal processing against voice signals or real time image signals.

The media signal processing section 54 is also configured to transmit the uplink signals to the MAC layer processing section 53 and to transmit the downlink signals to the radio base station interface 55, after the media signal processing is performed.

The radio base station interface 55 is an interface with the radiobase station Node B. The radiobase station interface 55 is configured to forward the uplink signals transmitted from the radio base station Node B to the MAC layer processing section 53 (or the media signal processing section 54) and to forward the downlink signals transmitted from the MAC layer processing section 53 (or the media signal processing section 54) to the radio base station Node B.

The call control section 56 is configured to perform a radio resource control processing, a channel setup and open processing by the layer-3 signaling, or the like.

Here, the radio resource control processing includes a call admission control processing, a handover processing, or the like.

Specifically, the call control section 56 is configured to acquire, from a specific radio base station, the reduction range of the maximum allowable transmission rate of user data in the uplink signaled to the mobile station UE connected to the specific radio base station.

In addition, the call control section 56 is configured to control the radio resources for transmitting the uplink user data based on the reduction range of the acquired maximum allowable transmission rate.

It should be noted that the call control section 56 may be configured to acquire the reduction range of the maximum allowable transmission rate by requesting the radio base station Node B to report the reduction range of the above-described maximum allowable transmission rate.

Operations of Mobile Communication System
According to First Embodiment of the Present
Invention Referring to FIGS. 11 and 12, operations of the mobile communication system according to the first embodiment of the present invention will be described.

Figure 11:
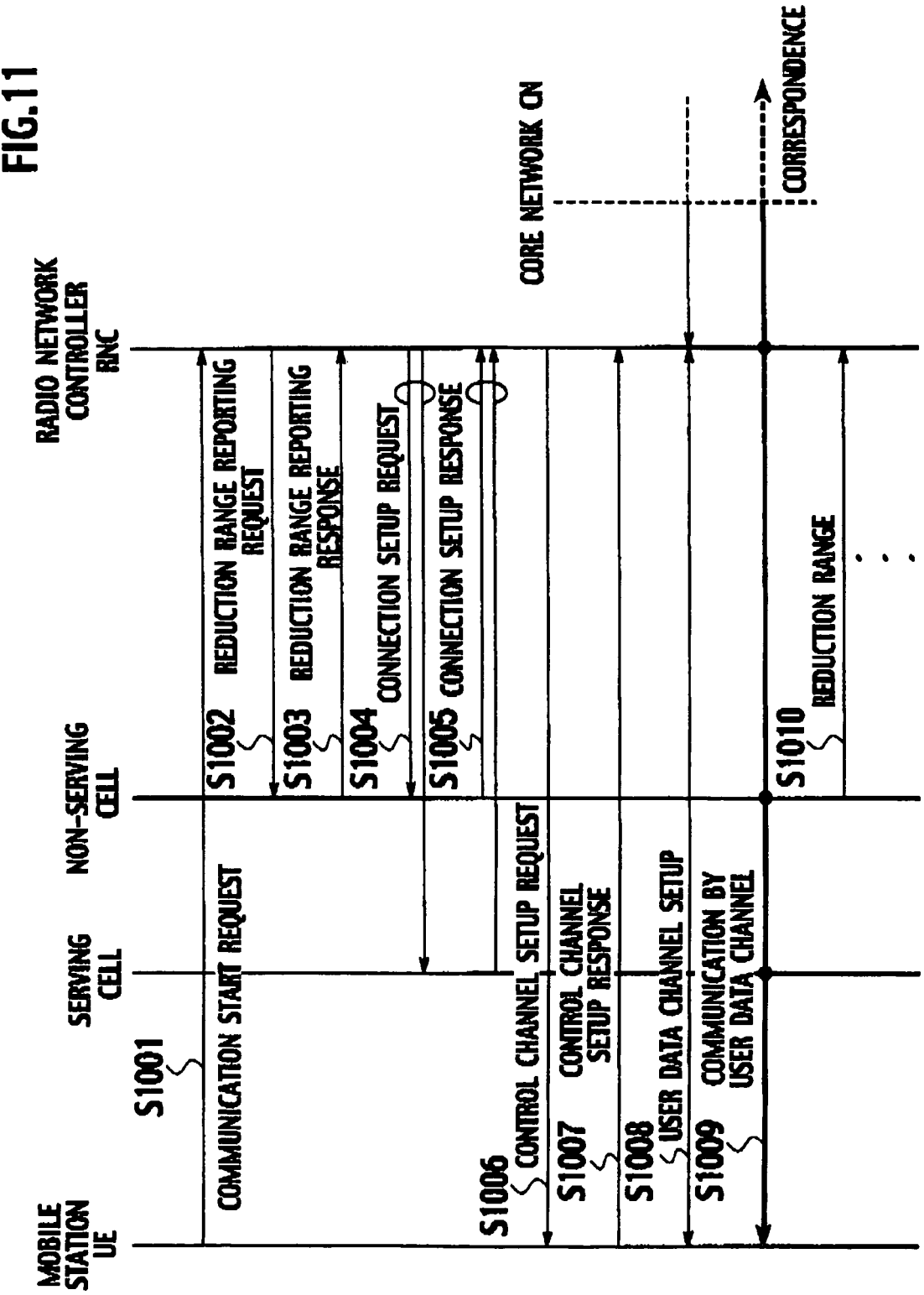
FIG. 11 is a sequence diagram showing operations of the mobile communication system according to the embodiment of the present invention.

First, referring to FIG. 11, operations of call admission control processing in the mobile communication system according to the first embodiment of the present invention are described.

Here, in the mobile communication system according to an embodiment of the present invention, the "Autonomous ramping method" shall be applied.

As shown in FIG. 11, in step S1001, a mobile station visiting a specific cell transmits a communication start request (a new E-DPCH setup request) to a radio network controller RNC.

In step S1002, the radio network controller RNC transmits, to a non-serving cell of the mobile station UE, a reduction range reporting request that requests to report the reduction range (reduction range shown by the "Down Command") of the last maximum allowable transmission rate of uplink user data signaled through the RGCH to the mobile station (non-serving mobile station) visiting the specific cell.

In step S1003, in response to the received reduction range reporting request, the non-serving cell transmits, to the radio network controller RNC, a reduction range reporting response for reporting the reduction range of the last maximum allowable transmission rate of the uplink user data signaled through the RGCH to the mobile station (non-serving mobile station) visiting the specific cell.

At that time, the radio network controller RNC determines whether or not to admit the communication start request (whether or not to set up the new E-DPCH) based on the reduction range of the reported maximum allowable transmission rate.

For example, the radio network controller RNC determines not to set up the new E-DPCH when the maximum allowable transmission rate reflecting the received reduction range is under a predetermined threshold.

When the radio network controller RNC determines to admit the communication start request, in step S1004, the radio network controller RNC transmits a connection setup request to the serving cell and non-serving cell of the mobile station UE.

Then, in step S1005, the serving cell and the non-serving cell of the mobile station UE transmit a connection setup response to the radio network controller RNC.

It should be noted that the radio network controller RNC may be configured to simultaneously transmit the reduction range reporting request and the connection setup request.

In steps S1006 and S1007, a control channel is set up between the mobile station UE and the radio network controller RNC.

In step S1008, a user data channel via a core network CN is set up between the mobile station UE and a correspondence, and in step S1009, communications start by such user data channel.

Then, the non-serving cell notifies the radio network controller RNC of the reduction range of the maximum allowable transmission rate at predetermined timing (see step S1010).

Figure 12:
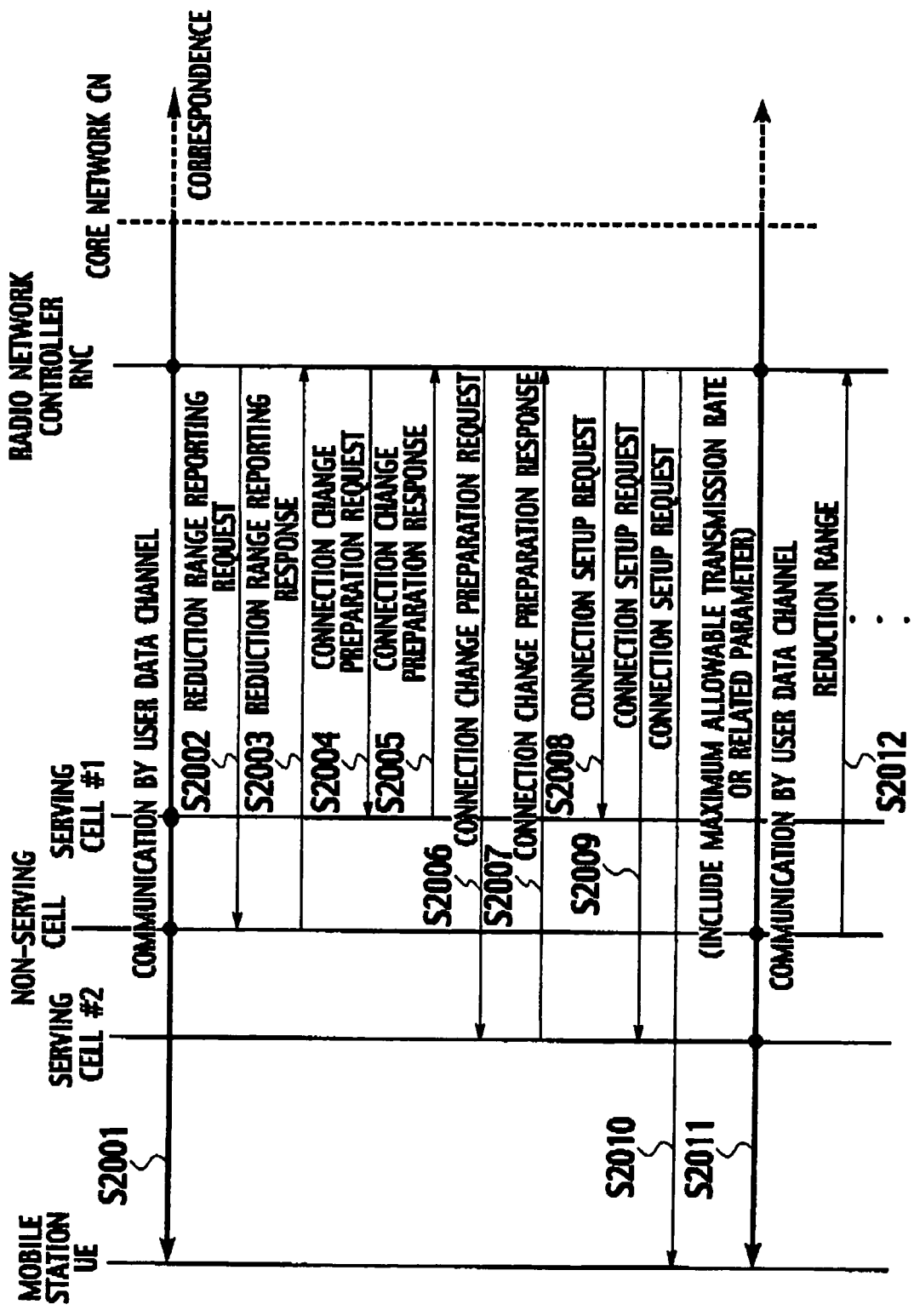
FIG. 12 is a sequence diagram showing operations of the mobile communication system according to the embodiment of the present invention.

Second, referring to FIG. 12, descriptions are given of operations that, in the mobile communication system according to the first embodiment of the present invention, the mobile station UE performs handover processing from a serving cell #1 to a serving cell #2.

As shown in FIG. 12, in step S2001, the mobile station UE is connected to the serving cell #1 and the non-serving cell #2, and performs communications by the user data channel.

When the radio network controller RNC determines that the above-described handover processing is needed, in step S2002, the radio network controller RNC transmits, to the non-serving cell, the reduction range reporting request that requests to report the reduction range of the last maximum allowable transmission rate of the uplink user data signaled through the RGCH to the mobile station (non-serving mobile station) visiting the specific cell.

In step S2003, in response to the received reduction range reporting request, the non-serving cell transmits, to the radio network controller RNC, a reduction range reporting response for reporting the reduction range of the last maximum allowable transmission rate of the uplink user data signaled through the RGCH to the mobile station (non-serving mobile station) visiting the specific cell.

At that time, the radio network controller RNC determines whether or not the above-described handover processing can be performed (whether or not a new connection can be set up between the serving cell #2 and the mobile station UE) based on the reported reduction range of the received maximum allowable transmission rate.

For example, when the maximum allowable transmission rate reflecting the reported reduction range is under the predetermined threshold, the radio network controller RNC determines that the serving cell #2 should not perform the handover processing.

When the radio network controller RNC determines that the above-described handover processing can be performed, in step S2004, the radio network controller RNC transmits, to the serving cell #1, a connection change preparation request that instructs preparation for changing the cell to which the mobile station is to be connected.

Then, in step S2005, the serving cell #1 performs preparation in response to the connection change preparation request, and transmits, to the radio network controller RNC, a connection change preparation response to notify that such preparation has been completed.

In step S2006, the radio network controller RNC transmits, to the serving cell #2, the connection change preparation request that instructs preparation for changing the cell to which the mobile station UE is to be connected.

Then, in step S2007, the serving cell #2 performs preparation in response to the connection change preparation request, and transmits, to the radio network controller RNC, the connection change preparation response to notify that such preparation has been completed.

In step S2008, the radio network controller RNC transmits, to the serving cell #1, a connection release request for releasing a connection between the mobile station UE and the serving cell #1.

Then, in steps S2009 and S2010, the radio network controller RNC respectively transmits, to the serving cell #2 and mobile station UE, connection setup requests for setting up the connection between the mobile station UE and the serving cell #2.

In step S2011, communications start through the user data channel set up between the mobile station UE and the serving cell #2.

Actions and Effects of Mobile Communication System According to the First Embodiment of the Present Invention In the mobile communication system according to the first embodiment of the present invention, a radio network controller RNC can correctly grasp radio communication quality of a mobile station under the control of each cell thereof, and can perform high-performance radio resource management.

In the mobile communication system according to the first embodiment of the present invention, the radio network controller RNC can correctly grasp, by transmitting a reduction range reporting request, the reduction range of the last maximum allowable transmission rate of uplink user data signaled through the RGCH to the mobile station (non-serving mobile station) visiting the specific cell, and can perform the high-performance radio resource management.

Further, according to the present invention, it is possible to provide a radio resource control method in which high-performance radio resource control can be performed by correctly grasping radio communication quality reflecting the reduction range of the maximum allowable transmission rate signaled by a radio base station Node B, a radio base station, a radio network controller.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A radio resource control method of controlling a radio resource for transmitting user data by a mobile station via an enhanced uplink (EUL) communication scheme, comprising:
   signaling, from a first radio base station communicatively connected to the mobile station in which the first radio base station controls a serving cell to the mobile station, a reduction of the maximum allowable transmission rate of the user data; and
   signaling from a second radio base station communicatively connected to the mobile station in which the second radio base station controls a non-serving cell to the mobile station, a reduction of the maximum allowable transmission rate of the user data; and
   reporting, from the second radio base station controlling the non-serving cell to a radio network controller, an accumulated amount of reduction value of the maximum allowable transmission rate of the user data signaled to the mobile station from the second radio base station controlling the non-serving cell,
   wherein only the non-serving cell reports to the radio network controller, the accumulated amount of reduction value of the maximum allowable transmission rate of the user data signaled to the mobile station.

2. The radio resource control method according to claim 1, wherein
   the second radio base station controlling the non-serving cell reports the accumulated amount of reduction value to the radio network controller at a predetermined time cycle.

3. The radio resource control method according to claim 1, wherein
   the second radio base station controlling the non-serving cell reports the accumulated amount of reduction value when the accumulated amount of reduction value becomes more than a predefined level.

4. A radio base station used in a mobile communication system in which a mobile station controls a transmission rate of user data to be transmitted via an enhanced uplink (EUL) communication scheme based on a maximum allowable transmission rate, the radio base station comprising:
   a maximum allowable transmission rate reduction signaling section configured to signal a reduction of the maximum allowable transmission rate, to a first mobile station using the radio base station as a serving cell, and to signal a reduction of the maximum allowable transmission rate to a second mobile station using the radio base station as a non-serving cell; and
   a maximum allowable transmission rate reduction reporting section configured to report, to a radio network controller an accumulated amount of reduction value of the maximum allowable transmission rate signaled to the second mobile station using the radio base station as the non-serving cell,
   wherein the radio base station is the non-serving cell of the second mobile station and reports, to the radio network controller, the accumulated amount of reduction value of the maximum allowable transmission rate of the user data signaled to the second mobile station, and wherein another radio base station that is a serving cell of the second mobile station does not report, to the radio network controller, the accumulated amount of reduction value of the maximum allowable transmission rate of the user data signaled to the second mobile station.

5. The radio base station according to claim 4, wherein
   the maximum allowable transmission rate reduction reporting section reports the accumulated amount of reduction value at a predetermined time cycle.

6. The radio base station according to claim 4, wherein
   the maximum allowable transmission rate reduction reporting section reports the accumulated amount of the reduction value, when the accumulated amount of reduction value becomes more than a predefined level.

7. A radio network controller used in a mobile communication system in which a mobile station controls a transmission rate of user data to be transmitted via an enhanced uplink (EUL) communication scheme based on a maximum allowable transmission rate, the radio network controller comprising:
   a maximum allowable transmission rate reduction acquiring section configured to acquire, from a first radio base station controlling a non-serving cell of the mobile station, an accumulated amount of reduction value of the maximum allowable transmission rate of the user data in the uplink, the reduction value being signaled to the mobile station connected to the first radio base station controlling the non-serving cell,
   wherein the maximum allowable transmission rate reduction acquiring section only acquires the accumulated amount of reduction value of the maximum allowable transmission rate of the user data in the uplink from the first radio base station controlling the non-serving cell of the mobile station and not from a second radio base station controlling a serving cell of the mobile station.

8. The radio network controller according to claim 7, wherein
   the maximum allowable transmission rate reduction acquiring section acquires the accumulated amount of reduction value from the first radio base station controlling the non-serving cell of the mobile station at a predetermined time cycle.

9. The radio network controller according to claim 7, wherein
   the maximum allowable transmission rate reduction acquiring section acquires the accumulated amount of reduction value from the first radio base station controlling the non-serving cell of the mobile station, when the accumulated amount of reduction value becomes more than a predefined level.

10. The radio resource control method according to claim 1, further comprising:
    determining, by the radio network controller based in part on the accumulated amount of reduction value reported to the radio network controller by the second radio base station controlling a non-serving cell, whether or not to authorize a handover of the mobile station from the first radio base station controlling the serving cell to another radio base station.

11. The radio base station according to claim 4, wherein the radio network controller determines whether or not a handover of the mobile station from the another radio base station controlling the serving cell to a different radio base station can be performed based in part on the accumulated amount of reduction value reported to the radio network controller by the radio base station controlling the non-serving cell.

12. The radio network, controller according to claim 7, wherein the radio network controller comprises a determining unit configured to determine whether or not a handover of the mobile station from the second radio base station controlling the serving cell to another radio base station can be performed based in part on the accumulated amount of reduction value reported to the radio network controller by the first radio base station controlling the non-serving cell.

13. The radio resource control method according to claim 1, wherein the first radio base station controlling the serving cell of the mobile station does not report, to the radio network controller, the accumulated amount of reduction value of the maximum allowable transmission rate of the user data signaled to the mobile station.

14. The radio base station according to claim 4, wherein the first radio base station controlling the serving cell of the mobile station does not report, to the radio network controller, the accumulated amount of reduction value of the maximum allowable transmission rate of the user data signaled to the first mobile station.

* * * * *